Sept. 1, 1953 S. J. SPURGEON 2,650,843
THRUST TRANSMITTING RETAINER FOR SHAFT MOUNTED MEMBERS
Filed Dec. 8, 1950
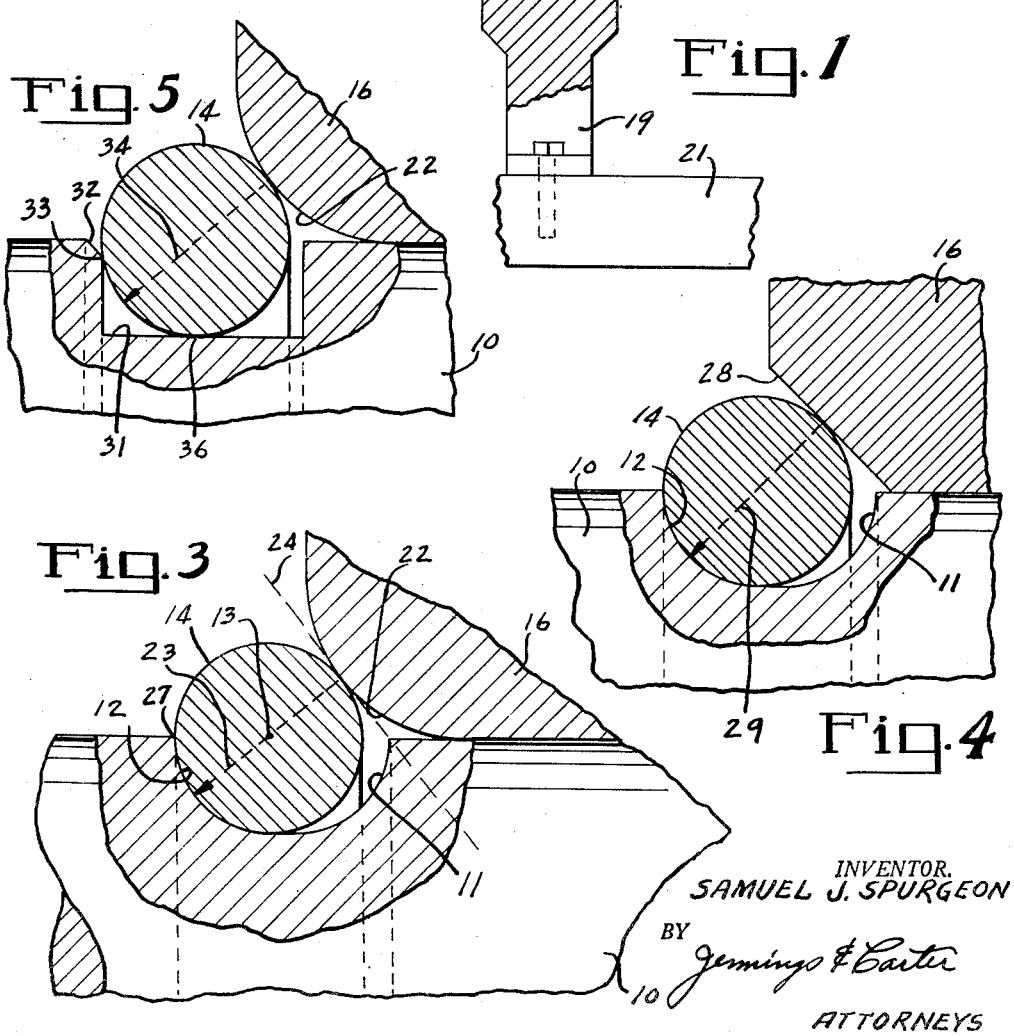
INVENTOR.
SAMUEL J. SPURGEON
BY Jennings & Carter
ATTORNEYS Patented Sept. 1, 1953

2,650,843

UNITED STATES PATENT OFFICE 2,650,843

THRUST TRANSMITTING RETAINER FOR SHAFT MOUNTED MEMBERS

Samuel J. Spurgeon, Birmingham, Ala.

Application December 8, 1950, Serial No. 199,795

1 Claim. (Cl. 287—20)

My present invention relates to means for transmitting thrust between a shaft and a member slidably surrounding the shaft and more particularly to a retainer which shall be thrust bearing without damage to the shaft or the member slidable thereon.

In many instances in mechanics it is desired to secure a member and a shaft passing slidably therethrough against relative axial movement. In the past it has been proposed to form a groove in the shaft and place therein a ring of flat stock against which the member to be retained engaged. Such assembly of elements as heretofore constructed has been unsatisfactory because the ring was pressed against the side of the groove near the surface of the shaft instead of into the bottom portions of the groove. This resulted in "burring" or deforming the shaft at the edge of the groove so that it was difficult to slide the member over the groove, as is often necessary in such assemblies. Further, the amount of thrust load which could be safely carried by such means was less than desirable.

It is the prime object of my invention, therefore, to overcome the above difficulties and provide a thrust transmitting retainer in the form of a ring, preferably of round stock, fitting in a groove formed in the shaft adjacent the member thereon, the member contacting the ring in such manner as to press it evenly against a portion of the groove lying below the surface of the shaft as the ring and groove are viewed in radial cross section, preventing deforming the metal of the shaft at the edge of the groove and resulting in a retainer capable of transmitting considerably more thrust than heretofore.

A further object is to provide an assembly of the character designated in which the ring is engaged substantially completely around its perimeter by a surface on the member so shaped as to contact the ring in the quadrant of its cross sectional area opposite the quadrant thereof engaging in the groove.

A still further object is to provide a retainer of the character designated in which the surface of the member to be retained is so shaped that it engages the ring tangentially as the ring is viewed in radial cross section, thus forcing the ring angularly downward into the groove, thereby distributing the load over a considerable area of the ring and groove.

Apparatus illustrating the features of my invention is shown in the accompanying drawing forming a part of this application in which:

Fig. 1 is a cross sectional view illustrating my improved retainer in combination with a shaft and a ball bearing;

Fig. 2 is a side elevational view of the ring removed from the remainder of the structure;

Fig. 3 is an enlarged detail sectional view illustrating the engagement of the side of the member to be retained with the retaining ring;

Fig. 4 is a view corresponding to Fig. 3 and showing a slightly modified form of ring engaging surface on the member; and, Fig. 5 is an enlarged detail sectional view showing a further modified form of the invention.

Referring now to the drawings for a better understanding of my invention and particularly to Figs. 1, 2 and 3, I show my improved form of retainer mounted on a shaft 10. The shaft 10 has a circumferential, rounded groove 11 therein. As best illustrated in Fig. 3 the groove 11 may be slightly elongated axially of the shaft and embodies a portion 12 which is substantially semicircular as viewed in radial section, being struck from the point 13, namely, from the center of the divided retaining ring 14. The groove 11 is disposed adjacent one end of the member to be retained, for instance the inner race 16 of a ball bearing 17. The bearing 17 may be supported in a suitable housing member 18, and this in turn may be supported on a bracket 19 from any form of member 21.

The edge of the inner race 16 of the bearing 17 may be rounded as indicated at 22. When this surface 22 is brought into contact with the surface of the ring 14 it will be seen that the engagement between these rounded surfaces is tangential. Thus, force transmitted to the shaft from the inner race 16 is transmitted along a line 23 which is normal to the line of tangency 24 between the ring and bearing race.

With the ring 14 assembled, in the event thrust is applied to the shaft 10 in the direction of the arrow 26, load is transmitted to the quadrant of the portion 12 of the groove 11 opposite the line of contact between the curved edge of the inner race 16 and the retaining ring 14. Thus, instead of force being applied to the side of the ring 14 parallel to the longitudinal axis of the shaft, my improved assembly transmits such force inwardly of the shaft, along line 23. I have found that this construction prevents formation of a burr at the point 27 as has heretofore been the case, and distributes the load over a large area of the groove.

By making the groove 11 elongated axially, I assure that the ring 14 has ample opportunity to be pressed downwardly into the groove, assuring that it seats therein at all times.

As shown in Fig. 4, instead of curving the engaging portion of the inner race 16 of the bearing I may form the same as an angularly inclined surface indicated by the numeral 28. It will be apparent that the thrust is directed along the line 29, to the quadrant of the ring 14 opposite the quadrant engaged by the surface 28.

In Fig. 5 I show a further modified form of my invention which is suitable for use on shafts having thereon a circumferential groove 31 not having a rounded portion. In this case I may bevel the edge of the groove as at 32 so that the ring 14 contacts that side of the groove below the surface of the shaft along the circular line or shoulder 33. The depth of groove 31 is equal approximately to the radius of the ring 14, as described in connection with the other modifications. Thus, when thrust is applied to the ring 14 by the curved surface 22 of the inner roll 16, it is directed inwardly of the shaft along line 34. The ring 14 contacts the side of the groove along the circle 33 and also along the circle 36 at the bottom of groove 31. The total thrust applied is thus divided between these two lines of contact. If the line 34 bisects the angle between the bottom of the groove and the side thereof, the thrust is equally divided between the lines 33 and 36. Obviously, I can employ either the rounded surface 22 or the inclined surface 28 with the modification shown in Fig. 5.

From the foregoing with either form of my invention it will be seen that thrust loads are adequately transmitted to the shaft in such manner as to prevent damage to the surface thereof so that if desired the member slidable thereon may be slid along the shaft, over the groove, when the divided or split ring 14 is removed. Further, in view of the fact that I have decreased the unit pressure for a given load either by distributing it over substantially a quarter circle of the groove as it is viewed in radial cross section or by dividing it between two lines of contact, my improved retaining mechanism is capable of transmitting considerably more load than those of the prior art. I am thus able to employ a ring of round stock as a thrust transmitting member instead of having to employ a ring of flat stock. In practice I find that in addition to the advantages already pointed out, my improved assembly is effective to prevent rotation of the inner roll on the shaft when under thrust load.

While I have shown my invention in association with a ball bearing it will be apparent that it is suitable for use with various forms of members which are relatively slidable on a shaft. I have chosen a ball bearing for illustrative purposes only and it is to be understood that my invention is not limited to the particular kind of member to be retained. In actual practice for ball bearings having an outer roll of about 2 inches in diameter, the radius of the curve 22 can be on the order of .040 inch while the radius of the ring and the portion 12 of the groove can be on the order of .03 inch. It will also be noted that the lines 13 and 29 passing radially through the ring are directed substantially at 45° inwardly of the shaft. By making the surfaces 22 and 28 contact the ring so as to press it at 45° into the groove I assure that the thrust is distributed evenly over the quarter circle of the ring and portion 12 of the groove or divided equally between contact lines 33 and 36.

While I have shown my invention in but two forms, it will be obvious to those skilled in the art that it is not so limited but is susceptible of various other changes and modifications without departing from the spirit thereof and, I desire therefore, that only such limitations shall be placed thereupon as are specifically set forth in the appended claim.

What I claim is:

In combination, a shaft, a member surrounding the shaft, the shaft and member being slidable axially relative to each other, there being a circumferential groove in the shaft, adjacent the member, elongated axially of the shaft and having a portion subtending an arc equal at least substantially to one-fourth of a circle as the groove is viewed in radial cross section, a ring of round stock of a radius equaling the radius of said portion of the groove and fitting therein, and a surface on the member tangentially contacting the ring around the side thereof in the quadrant opposite the quadrant contacting the groove and at such an angle relative to the surface of the ring as to press the ring downwardly and inwardly of the shaft when the member moves toward the groove.

SAMUEL J. SPURGEON.

References Cited in the file of this patent

UNITED STATES PATENTS

| Number | Name | Date |
| --- | --- | --- |
| Re. 18,144 | Heiermann | Aug. 4, 1931 |
| 966,666 | Dimler | Aug. 9, 1910 |
| 1,179,060 | Williamson | Apr. 11, 1916 |
| 1,192,404 | Ewart | July 25, 1916 |
| 1,213,509 | Lee | Jan. 23, 1917 |
| 1,262,370 | Mead | Apr. 9, 1918 |
| 1,287,463 | Schwitzer | Dec. 10, 1918 |
| 1,418,379 | Karle | June 6, 1922 |
| 1,650,573 | Searles | Nov. 22, 1927 |
| 2,522,991 | Caserta | Sept. 19, 1950 |